UNITED STATES PATENT OFFICE 2,504,085

MINERAL OIL COMPOSITION CONTAINING HEXACHLOROTHIOLENE

Henry D. Norris, Woodbury, N. J., and John H. McCracken, Tulsa, Okla., assignors to Socony-Vacuum Oil Company, Incorporated, a corporation of New York No Drawing. Application December 22, 1948, Serial No. 66,832

3 Claims. (Cl. 252—48.8)

This invention relates to an improved mineral oil composition and, more particularly, is directed to a lubricant comprising in combination a major proportion of a mineral oil and a minor proportion, sufficient to improve the extreme pressure characteristics of the oil, of 2,2,3,4,5,5-hexachloro-3-thiolene.

The chlorination of thiophene has heretofore been undertaken to produce monochlorothiophene and various polychlorothiophenes. It has been reported that during the course of the chlorination reaction, hydrogen chloride addition products of thiophene and chlorothiophenes are formed. These products have previously been considered very unstable and none has been isolated. The recommended literature method for removing said addition products from the chlorinated reaction mixture has involved contacting said mixture for a rather long time with alcoholic potassium hydroxide at the boiling point of the alcohol. Monochlorothiophenes are obtained from the reaction mixture so treated by precipitating with water, steam-distilling and fractionating to yield, as products, monochloro-, dichloro-, trichloro-, and tetrachlorothiophene.

In accordance with the present invention, it has now been found that when thiophene is subjected to complete chlorination in the presence of iodine, a new and stable reaction product of 2,2,3,4,5,5 - hexachloro - 3 - thiolene is obtained. This new composition of matter is a lubricating oil addition agent and is particularly adapted for use as an additive in extreme pressure lubricants. Moreover, as those skilled in the art will recognize, the new compound of this invention, by reason of the high activity of its chlorine atoms, will serve as a useful chemical intermediate in the synthesis of further new compositions.

It is, accordingly, an object of the present invention to provide a new lubricating oil addition agent. Another object is to provide a process for synthesizing 2,2,3,4,5,5-hexachloro-3-thiolene. A still further object is the provision of an improved mineral oil composition comprising a major proportion of mineral oil and a minor proportion of 2,2,3,4,5,5-hexachloro-3-thiolene. Other objects and advantages of the present invention will be apparent to those skilled in the art from the following description.

2,2,3,4,5,5-hexachloro-3-thiolene is a colorless substance having a melting point of 40–41° C. and a boiling point of 89° C. at a pressure of 2 millimeters of mercury. It is stable up to a temperature of about 225° C., above which the compound tends to decompose into chlorine and various polychlorothiophenes. The new compound has a density of 1.753 at 26.5° C. compared to that of water at 4° C. and a refractive index at 20° C. of 1.5878.

The formula of 2,2,3,4,5,5-hexachloro-3-thiolene is $C_4SCl_6$. The hexachlorothiolene obtained in accordance with the present invention has the following analysis:

|  | Analysis | Theoretical |
|---|---|---|
|  | Per Cent | Per Cent |
| Chlorine | 72.47 | 72.7 |
| Sulfur | 10.92 | 10.91 |
| Carbon | 16.49 | 16.41 |

An infra-red absorption spectra study of the compound showed that it had lost all characteristics of thiophene and a definite absorption band for an olefinic linkage appeared. Further evidence that the compound of this invention was hexachlorothiolene was shown by reaction of the compound with zinc dust. As is well known to those skilled in the art, dihalogen compounds of the nature —CHCl—CHCl— dehalogenate upon treatment with zinc dust to produce olefins. The compound of this invention, upon treatment with zinc dust, gave a product mixture which analysis showed to contain a small amount of dichlorothiophene, a small amount of trichlorothiophene, and about 80 per cent of 2,3,4,5-tetrachlorothiophene. The predominant reaction accordingly was:

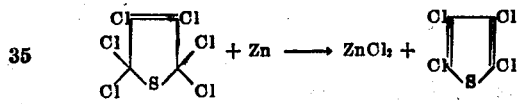

Likewise, pyrolysis of the new compound yielded 2,3,4,5-tetrachlorothiophene and chlorine in accordance with the equation:

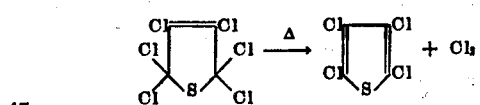

The tetrachlorothiophene was identified by its boiling point of 97° C. at 7 mm. pressure and by refractive index $n_D^{19}$ 1.5908.

Reaction of the compound with sodium methoxide yielded a material having a boiling point of 135° C. at 11 mm. pressure, a refractive index of $n_D^{20}$ 1.5120 and which analyzed for tetramethoxydichlorothiolene, $C_8H_{12}Cl_2O_4S$. Steam distillation resulted in a 92 per cent recovery of the initial compound, hexachlorothiolene. This reaction with sodium methoxide and the fact that the hexachlorothiolene could be steam-distilled ruled out structures in which the chlorine is attached to the sulfur atom.

Oxidation of the new compound with nitric acid yielded dichloromaleic acid in accordance with the following equation:

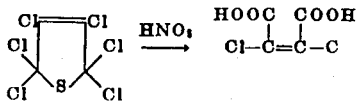

This reaction served to establish the position of the double bond.

Thus, the physical properties and elemental analysis prove that the correct molecular formula for the new compound is $C_4Cl_6S$. The method of synthesis from thiophene and the subsequent degradation of the hexachlorothiolene to 2,3,4,5-tetrachlorothiophene show that the heterocyclic ring of four carbon atoms and one sulfur atom was not ruptured. Infrared spectrographic analysis indicated that there was no unsaturation characteristic of the thiophene nucleus and that, instead, there was one olefinic type double bond. Further, the position of the double bond was shown upon oxidation with nitric acid. These facts, taken and considered together, definitely establish the compound as 2,2,3,4,5,5-hexachloro-3-thiolene having the structure:

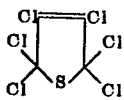

In accordance with the present invention, 2,2,3,4,5,5-hexachloro-3-thiolene is obtained by subjecting thiophene to complete chlorination in the presence of a catalyst of iodine and with or without the use of solvents, such as chloroform, carbon tetrachloride, etc.

The chlorination reaction of the present invention is carried out at a temperature varying between about 0° C. and about 120° C., preferably at a temperature between about 40° C. and about 70° C. and a reaction time sufficient to effect a complete chlorination of thiophene. The amount of iodine employed as catalyst is less than 0.5 mole per mole of thiophene reactant. Generally, minute amounts of iodine are employed, usually in the range of from about 0.0005 to about 0.1 mole of iodine per mole of thiophene. The above amounts, while representative of those which will generally be employed in the present process, do not appear to be critical, it being only necessary that the amount of iodine present be less than about 0.5 mole per mole of thiophene. This is illustrated by the data tabulated below:

Table I

| Iodine in grams per Mole of Thiophene | Grams of 2,2,3,4,5, 5-Hexachloro-3-thiolene per Mole of Thiophene |
|---|---|
| 10 | 220 |
| 2.4 | 200 |
| 1.66 | 216 |
| 0.33 | 216 |
| 0.1 | 175 |

The following example will serve to illustrate the process of this invention without limiting the same:

*Example 1*

Two hundred ten grams of thiophene (2.5 moles) and 10 grams of iodine were placed in a 1-liter flask equipped with a stirrer, a spiral-type condenser, a thermometer, and a chlorine inlet tube. Chlorine was bubbled through the thiophene-iodine mixture at a temperature of about 40° C. at such a rate as to require cooling of the flask to avoid an increase in temperature. After about one hour, the color of the iodine disappeared and the temperature was allowed to rise to 70–75° C. The temperature was maintained at 70–75° C. through cooling for about 4.5 hours. The product was washed with water and subsequently dissolved in benzene. The benzene solution was washed with a 5% aqueous solution of potassium carbonate, given two separate washes with a 5% aqueous solution of sodium thiosulfate, again washed with a 5% solution of potassium carbonate, and finally given two separate washes with water. The washed benzene solution was filtered and then dried over anhydrous sodium sulfate. The dried product was filtered and the solvent was removed on a steam bath. The product thus obtained was distilled under reduced pressure to yield 562 grams of 2,2,3,4,5,5-hexachloro-3-thiolene.

As stated hereinbefore, the chlorination reaction may be effected in the presence or absence of a solvent. Chloroform and carbon tetrachloride may be mentioned by way of non-limiting illustrations.

The following example will serve to illustrate the chlorination reaction where a solvent is used:

*Example 2*

Twenty-five and 2/10 grams of thiophene (0.3 mole), 75 grams of chloroform (solvent), and 3 grams of iodine were placed in a 500-cc., three-necked flask equipped with a stirrer, a reflux condenser, a thermometer, and a chlorine inlet tube. Chlorine was bubbled into the flask for 50 minutes, at a rate to maintain a temperature of 40° C. At the end of 50 minutes, the temperature increased to 55–60° C. and remained at this level for a period of time of about 3 to 5 hours, at the end of which the temperature decreased, indicating that the reaction had been completed. The product was washed with water and then dissolved in ethyl ether. This solution was given two separate washes with water, two separate washes with a 5% aqueous solution of potassium carbonate, two separate washes with a 5% aqueous solution of sodium thiosulfate, another wash with a 5% aqueous solution of potassium carbonate, and finally another two separate washes with water. The washed ethyl ether solution was dried overnight over anhydrous sodium sulfate. The solvent was removed on a water bath and the product thus obtained was distilled under reduced pressure. The resulting product was redistilled to yield 2,2,3,4,5,5-hexachloro-3-thiolene.

The amounts of 2,2,3,4,5,5-hexachloro-3-thiolene present in lubricating compositions of this invention will generally be such as to improve the extreme pressure characteristics of the oil. The amounts added for this purpose may be in the range of about 0.1 per cent and about 20 per cent by weight and more generally are between about 1 and about 10 per cent by weight. The oil base may also desirably contain other well known constituents, such as those which improve the oiliness, pour point, cold test, oxidation properties, etc. of the oil.

The beneficial results obtained by adding varying amounts of 2,2,3,4,5,5-hexachloro-3-thiolene to gear oils may be shown by standard lubricant tests, such as the Almen load test and the S. A. E. gear oil test. The Almen load test consists of placing a 30-gram sample of the lubricant to be tested in a small metal cup of the Almen test machine. The cup is provided with a ¼" drill rod shaft rotating in a split bushing at 600 revolutions per minute. Weights are added at ten-second intervals over a period of 5 minutes to a loading lever working to apply pressure on the split bushing. The Almen value is expressed as the number of weights. Each weight weighs 2 pounds and is equivalent to 1000 pounds per square inch pressure. Torque meter readings are valuable as indications of the friction developed in the test. The S. A. E. gear oil test consists of placing a 120-gram sample of the lubricant to be tested in the standard S. A. E. gear test machine and the two steel test rings thereof are then adjusted in place. The shafts rotate the rings at different speeds against each other in the same direction so as to produce a combination of rolling and sliding action while a gradually increasing load is applied. The main shaft rotates at 1000 revolutions per minute. The loading rate is 75 pounds per minute and the test is continued until scoring occurs.

Results of the foregoing tests using a solvent-refined Mid-Continent oil having a Saybolt Universal viscosity of 67 seconds at 210° F. with and without a minor proportion of 2,2,3,4,5,5-hexachloro-3-thiolene are given below:

*Table II*

| Amount of 2,2,3,4,5,5-Hexachloro-3-thiolene, Per Cent by Weight | S. A. E. Test Lbs. Scale | Almen Load Test | |
|---|---|---|---|
| | | Wts. | Torque |
| None | 20 | 3 | Test specimen seized before test was completed. |
| 3 | 460 | 6 | 17. |
| 5 | over 530 | 16 | 21. |

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

This application is a continuation-in-part of co-pending application Serial Number 747,328, filed May 10, 1947, which, in turn, is a continuation-in-part of application Serial Number 613,202, filed August 28, 1945, now abandoned.

We claim:

1. A mineral oil composition comprising a major proportion of mineral oil and a minor proportion, sufficient to improve the extreme pressure characteristics of the oil, of 2,2,3,4,5,5-hexachloro-3-thiolene.

2. A mineral oil composition comprising a major proportion of mineral oil and between about 0.1 and about 20 per cent by weight of 2,2,3,4,5,5-hexachloro-3-thiolene.

3. A mineral oil composition comprising a major proportion of mineral oil and between about 1 and about 10 per cent by weight of 2,2,3,4,5,5-hexachloro-3-thiolene.

HENRY D. NORRIS.
JOHN H. McCRACKEN.

REFERENCES CITED

The following references are of record in the file of this patent:

UNITED STATES PATENTS

| Number | Name | Date |
|---|---|---|
| 2,118,215 | Marsh et al. | May 24, 1938 |
| 2,178,513 | Prutton | Oct. 31, 1939 |
| 2,204,620 | Prutton | June 18, 1940 |
| 2,208,161 | Prutton | July 16, 1940 |
| 2,355,173 | Morell | Aug. 8, 1944 |

Certificate of Correction

Patent No. 2,504,085                                      April 11, 1950

HENRY D. NORRIS ET AL.

It is hereby certified that error appears in the printed specification of the above numbered patent requiring correction as follows:

Column 3, lines 8, 9 and 10, inclusive, for that portion of the formula reading 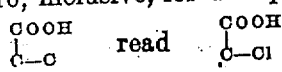 and that the said Letters Patent should be read with this correction therein that the same may conform to the record of the case in the Patent Office.

Signed and sealed this 19th day of September, A. D. 1950.

[SEAL]

THOMAS F. MURPHY,
                                                   *Assistant Commissioner of Patents.*